(12) United States Patent
Hunter et al.

(10) Patent No.: US 7,228,641 B2
(45) Date of Patent: *Jun. 12, 2007

(54) BEARING ARRANGEMENT

(75) Inventors: Stephen Paul Hunter, Bristol (GB); Michael Robert John Reeve, Malmesbury (GB); David Roberts McMurtry, Dursley (GB); Hugo George Derrick, Bath (GB)

(73) Assignee: Renishaw PLC, Gloucestershire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/053,848

(22) Filed: Feb. 10, 2005

(65) Prior Publication Data

US 2005/0190999 A1 Sep. 1, 2005

Related U.S. Application Data

(63) Continuation of application No. 10/089,520, filed as application No. PCT/GB01/03461 on Aug. 1, 2001, now Pat. No. 6,860,637.

(30) Foreign Application Priority Data

Aug. 5, 2000 (GB) ................................. 0019200.5

(51) Int. Cl.
*G01B 3/00* (2006.01)
*G01B 5/00* (2006.01)

(52) U.S. Cl. .............................. 33/556; 33/559; 33/561

(58) Field of Classification Search .................. 33/556, 33/558, 559, 561, 503
See application file for complete search history.

(56) References Cited

U.S. PATENT DOCUMENTS

| 1,331,113 A | 2/1920 | Lee |
| 3,161,447 A | 12/1964 | Nils |
| 3,319,484 A | 5/1967 | Prest |
| 3,572,157 A | 3/1971 | Adams et al. |
| 3,929,392 A | 12/1975 | Ogino |
| 4,265,498 A | 5/1981 | Luce et al. |
| 4,792,245 A | 12/1988 | Fuke et al. |
| 4,888,877 A | 12/1989 | Enderle et al. |
| 5,084,981 A * | 2/1992 | McMurtry et al. ............. 33/556 |
| 5,189,806 A * | 3/1993 | McMurtry et al. ............. 33/503 |
| 5,213,000 A | 5/1993 | Saya et al. |
| 5,299,361 A * | 4/1994 | Fiedler ......................... 33/559 |
| 5,365,673 A * | 11/1994 | Haimer et al. ................. 33/559 |
| 5,374,125 A * | 12/1994 | McMurtry et al. ............. 384/9 |
| 5,486,054 A | 1/1996 | Nagata et al. |
| 5,604,593 A | 2/1997 | McMurtry |

(Continued)

FOREIGN PATENT DOCUMENTS

DE 1 403 824 10/1968

(Continued)

*Primary Examiner*—Diego Gutierrez
*Assistant Examiner*—Amy R. Cohen
(74) *Attorney, Agent, or Firm*—Oliff & Berridge, PLC (57) ABSTRACT

A bearing arrangement for an articulatable support includes bearing assemblies. In one embodiment, the assemblies have a ball and aperture having sliding contact at discrete areas during relative rotation. In another embodiment, the sliding contact may be formed at a ball and a plastics (e.g. P.T.F.E. support). Resilient displacement of the bearing contact along a rotational axis is provided by planar spring supports and a rigid support is provided by supports.

21 Claims, 5 Drawing Sheets

U.S. PATENT DOCUMENTS

| | | | |
|---|---|---|---|
| 5,675,902 A * | 10/1997 | Chase | 33/559 |
| 5,687,293 A * | 11/1997 | Snell | 700/254 |
| 5,724,745 A * | 3/1998 | Brenner et al. | 33/503 |
| 5,829,148 A * | 11/1998 | Eaton | 33/503 |
| 5,848,843 A | 12/1998 | Lee | |
| 5,886,438 A | 3/1999 | Kawanishi | |
| 5,961,172 A | 10/1999 | Ament et al. | |
| 6,209,411 B1 * | 4/2001 | McMurtry | 74/490.06 |
| 6,406,191 B1 | 6/2002 | Koyama et al. | |
| 6,449,861 B1 * | 9/2002 | Danielli et al. | 33/556 |
| 6,604,860 B2 | 8/2003 | Yamamura | |
| 6,854,195 B2 * | 2/2005 | Jordil et al. | 33/556 |
| 6,860,637 B2 * | 3/2005 | Hunter et al. | 384/245 |
| 6,931,745 B2 * | 8/2005 | Granger | 33/503 |
| 6,938,353 B2 * | 9/2005 | Rouge et al. | 33/561 |
| 7,100,297 B2 * | 9/2006 | McMurtry et al. | 33/556 |
| 2005/0256672 A1 * | 11/2005 | McMurtry et al. | 702/150 |

FOREIGN PATENT DOCUMENTS

| | | |
|---|---|---|
| DE | 4315161 A1 | 11/1994 |
| EP | 0 680 599 B1 | 6/1999 |
| EP | 1 177 855 A2 | 6/2002 |
| JP | A 10 322961 | 12/1998 |
| WO | WO 9514905 A1 * | 6/1995 |

* cited by examiner

BEARING ARRANGEMENT

CROSS-REFERENCE TO RELATED APPLICATIONS

This is a Continuation of application Ser. No. 10/089,520 which in turn is a National Stage of PCT/GB01/03461, filed Aug. 1, 2001. The entire disclosure of the prior applications are hereby incorporated by reference herein in its entirety.

BACKGROUND

The present invention relates to a bearing arrangement, particularly but not exclusively in the field of precision bearings for example for measurement apparatus having articulated wrist parts.

Precision bearings of many forms are known. The simplest rely on the sliding contact to transfer loadings. More complicated bearings have rolling contact, for example ball race or roller sets. Rolling contact is preferred for high loadings, high rotational speeds and long bearing life. However these bearings need to be manufactured in an accurate manner and are consequently expensive. Where thin section parts are used they tend to take up the shape of the housing to which they are fitted. As a consequence, their housings too must be accurately made if good accuracy of movement is to be maintained.

Sliding contact bearings may be used for precision bearings, for example watch bearings. Watch bearings, and similar, are lightly loaded and so do not need large bearing surfaces to transfer forces. Typically a rotatable shaft might have conical ends and be held in place between two plates with complementary end accepting parts. This type of bearing, although simple and low cost, is difficult to adjust when wear takes place. Wear being more common where sliding contact is employed.

One commercially available bearing, used typically for roundness measurement machines provides a fixed block, e.g. of P.T.F.E., having a conical recess and a ball seated rotatably within the recess. Again wear adjustment for such a bearing is problematic and the arrangement is not used in pairs.

SUMMARY

According to one aspect of the present invention there is provided a bearing arrangement comprising:
two bearing assemblies each located on an axis;
each bearing assembly comprising two parts in contact during their relative rotation;
at each assembly the contact taking place in a plane;
one of the assemblies allowing resilient displacement of its contact plane and the other of the assemblies being relatively rigid for preventing substantial displacement of its contact plane.

Figures 5, 7, 8:
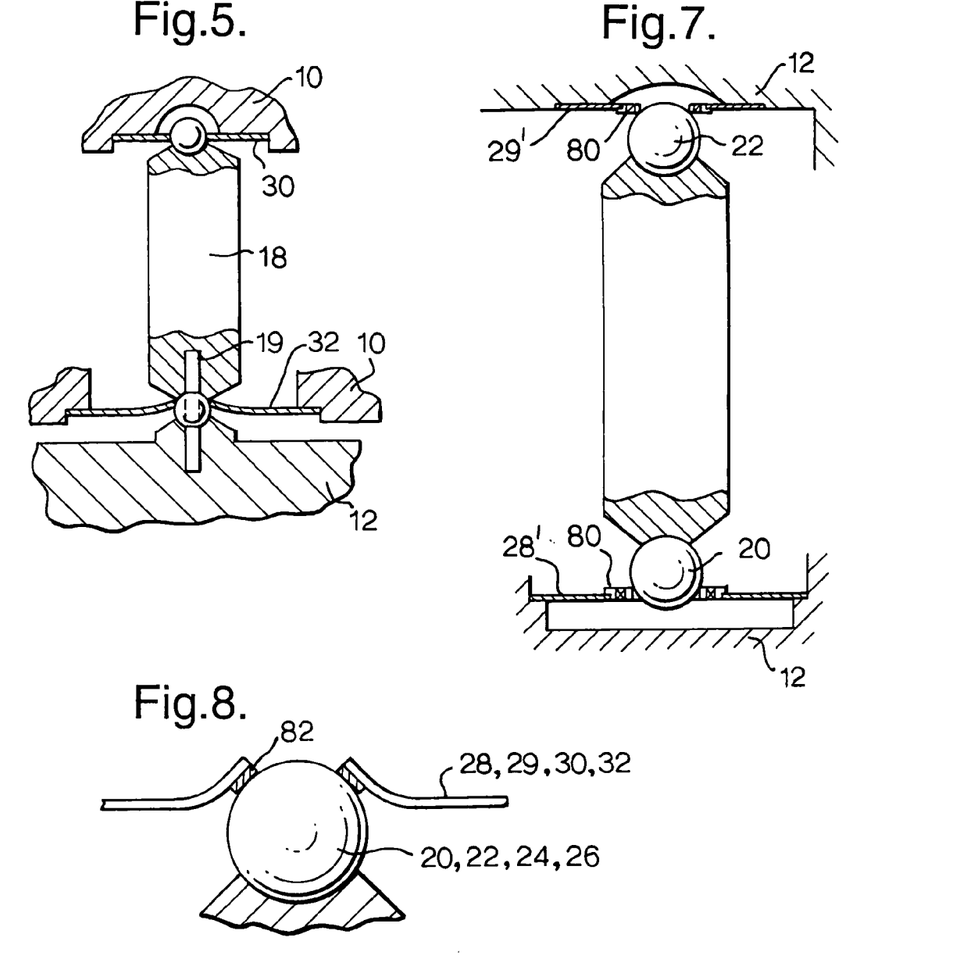
FIG. 5 shows an alternative arrangement of some of the parts shown in FIG. 1.
FIG. 7 shows yet another alternative arrangement of some of the parts shown in FIG. 1.
FIGS. 8 to 11 show alternatives to some of the parts shown in FIG. 1.
Figure 6A:
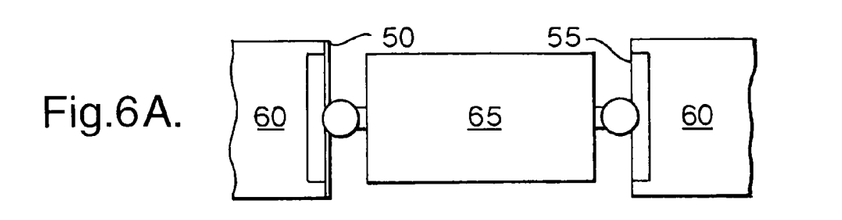
FIGS. 6A–6F show various configurations of bearing arrangements according to the invention.
Figure 6B:
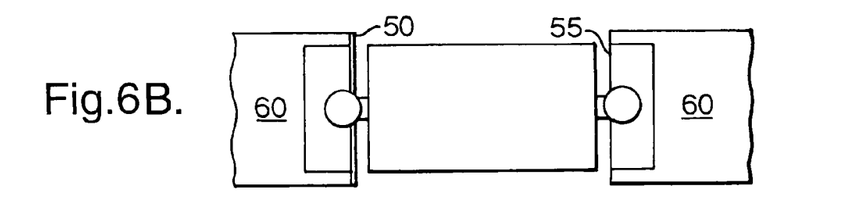
Figure 6C:
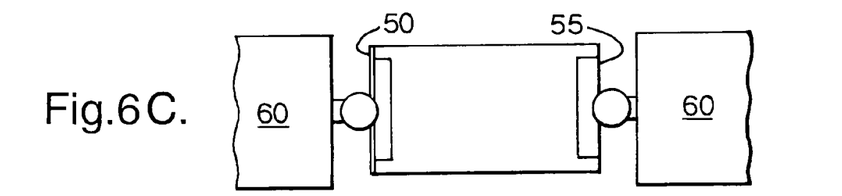
Figure 6D:
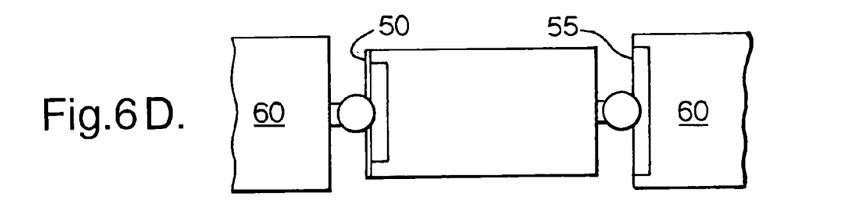
Figure 6E:
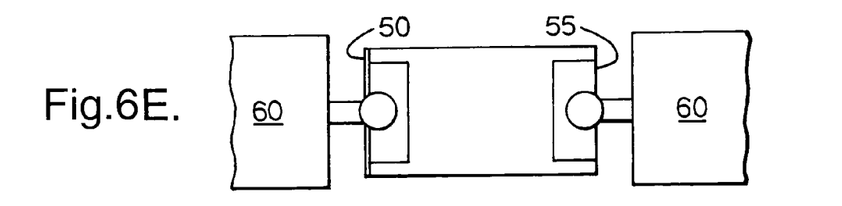
Figure 6F:
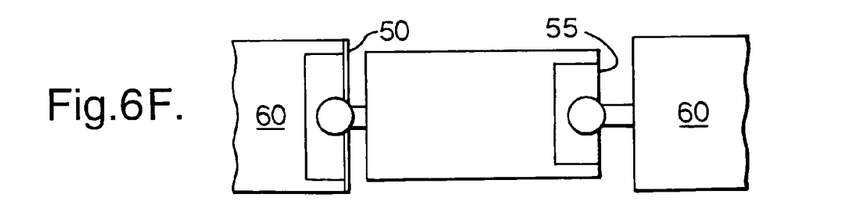
Figure 9:
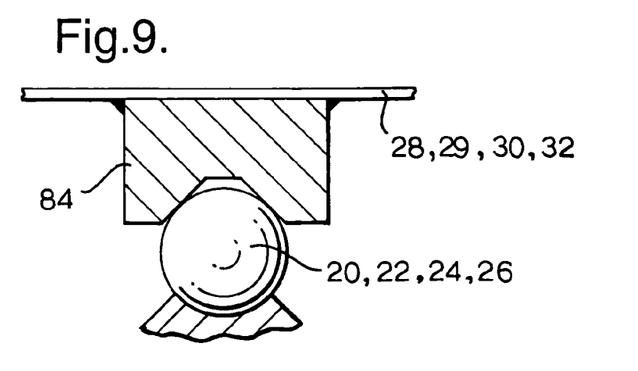

Another well-known bearing is a ball joint. Typically a spherical part is held in a complementary socket for movement with more than one degree of freedom. An example of such a joint is shown in FIGS. 8 and 9 of European Patent No. 680599 (Renishaw) see balls 80 and triangular socket 78.

Each of the sockets 78 is formed in a leg 77 which is resiliently movable. This means that tube 72 supported between two legs 77 may be displaced resiliently back and forth. In so doing these legs alter the position of the rotational axis of the tube 72.

According to a second aspect of the invention there is provided a bearing arrangement comprising:
two bearing assemblies each located on an axis;
each bearing assembly comprising two parts in contact during their relative rotation;
at each assembly the contact taking place in a plane;
at least one of the assemblies allowing resilient displacement of its contact plane in a direction parallel to the axis.

The shortcomings mentioned above are particularly noticeable when such bearings are used for rotation (including pivoting) of elements of measuring equipment. In such equipment exact repeatable circular motion is necessary even after bearing wear or thermal changes in dimensions of component parts, and lightness and low cost are desirable.

According to a third aspect of the invention there is provided measurement apparatus having a pivot including a bearing arrangement according to the first or second aspect of the invention. Preferably the measurement apparatus includes a mechanical wrist element.

Preferred features of the invention according to the first, second or third aspects are given in the subsequent paragraphs.

The two parts of each of the bearing assemblies may include a female part having a recess or aperture and a male part acceptable into the recess or aperture.

The contact may be sliding contact.

Where there is sliding contact this contact may be between the female and the male parts of at least one of the bearing assemblies and may be at discrete locations in the plane.

The discrete locations may be provided by a non-circular recess or aperture (e.g. triangular or trihedral) in the female part co-operating with a circular (for example spheroidal or conical) male part, or may be provided by a circular (e.g. conical or straight-sided) recess or aperture in the female part co-operating with a non-circular (e.g. trihedral) male part.

Alternatively the contact may be rolling and the parts may include a ball race.

The movement of the plane may be provided by a movable female part and where the movement is resilient the female part may be resiliently movable. Possibly the female part is a planar support having spring qualities.

Associated with each assembly may be first and second relatively rotatable housings. The female and male parts of each assembly may be associated with either of the first and second housings.

According to a fourth aspect of the invention there is provided a support for a measurement probe comprising an articulatable wrist providing two axes of rotation for the probe, at a first axis there being provided a bearing arrangement as claimed in any one of claims 1 to 10, the bearing arrangement being connected to a spindle having an extension extending beyond the bearing arrangement in the direction of the first axis.

The invention is described hereinafter with reference to measurement apparatus for use on a coordinate measuring machine (CMM). However, this is an example of one possible application and is not intended to limit the invention in any way. The invention could be applied to any apparatus where relative rotation of parts is required e.g. a rotatable support for optical components which require accurate rotation possibly of the type described in UK Patent Application No. GB 0019199.9.

BRIEF DESCRIPTION OF THE DRAWINGS

The invention will now be described with reference to the drawings, wherein.

DETAILED DESCRIPTION OF EMBODIMENTS

Figure 1:
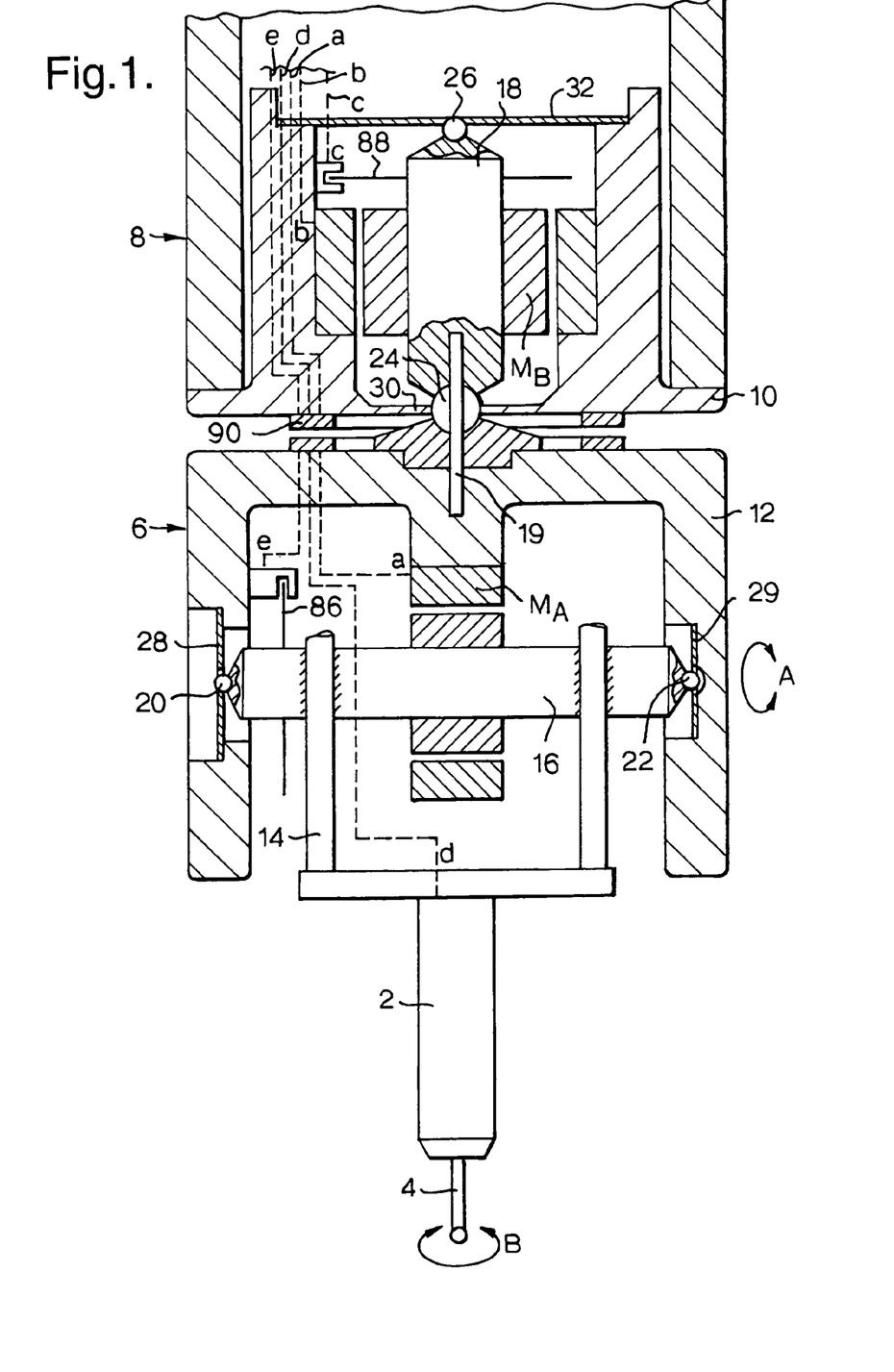
FIG. 1 shows a probe, and an articulatable probe wrist employing the invention.

Referring to FIG. 1 there is shown a probe 2 having a stylus 4 for contact with an item to be measured. Conventionally, in use, the quill 8 of a CMM will be moved in any of the three orthogonal axes until the stylus 4 touches an item. The position of the quill 8 with respect to the three axes is then used to determine dimensions of the item.

In addition to the three axes, a probe head 6, attached to the quill 8 between the quill and the probe has a wrist configuration which adds two rotational axes of movement to the probe—rotation "A" in a vertical plane and rotation "B" in a horizontal plane. Motors $M_A$ and $M_B$ provide the torque for the rotation in the two axes, so measurements may be taken with or without moving the quill 8, by moving the probe head 6.

Articulation of the head allows more complex movements of the probe, for example to measure the roundness of a bore along its length by moving the stylus in a helical path around the bore. The position of the stylus can be calculated from the known rotational position of the stylus and the three CMM axis readings.

Such rotational movement of the probe requires accurate and repeatable movement of the bearings in the probe head. In this embodiment the probe is mounted to a carriage 14 held on a horizontal spindle 16. The spindle 16 has a bearing assembly at each end connected to a lower housing 12 of head 6. The lower housing 12 is connected to a vertical spindle 18 in an upper housing 10 of the head 6 which has two bearing assemblies also.

Horizontal spindle 16 may rotate relative to the lower housing 12. Rotation is achieved by use of two bearing assemblies having parts 20 and 28, and 22 and 29. Male bearing parts in the form of balls 20 and 22 are fixed (for example by means of adhesive) to the ends of the spindle 16. Each ball is accommodated in a female part in the form of supports 28 and 29 each having male part accepting apertures therein such that the spindle's only possible movement is rotation "A". Similarly lower housing 12 is rotatably mounted via vertical spindle 18. Two bearing assemblies are shown comprising male parts in the form of two balls 24 and 26 accommodated in two female parts in the form of supports 30 and 32 having apertures therein, all providing rotational movement "B".

Balls 20,22,24 and 26 can be manufactured by known techniques to very high accuracy, i.e. less than 0.16 microns overall roundness tolerance. This exact sphericity provides accurate movement of the probe in rotation. The balls may be of a ceramic, ruby or steel material.

Each spindle 16 and 18 has a fixed support i.e. 29 and 30 respectively and a movable support i.e. 28 and 32. The fixed support is held in fixed relation to its mounting whereas the movable support can move resiliently in the direction of the associated rotational axis.

Power and signal paths a,b,c,d and e are shown. Path a provides power to motor $M_A$ for rotating spindle 16 (and hence probe 2) about axis A. In practice this rotation will be pivoting motion in an arc of up to 180°. Path b provides power to motor $M_B$ for rotating spindle 18 (and hence lower housing 12 and probe 2) about axis B. In practice this rotation can be continuous so arcuate pivoting back and forth is not necessary.

The rotational position of spindles 16 and 18 can be determined by rotary encoders 86 and 88 respectively. Paths e and c are provided for the encoder signals.

Paths a,d and e have a rotary coupling 90, the two halves of which may be in sliding contact (e.g. by use of slip rings) or may be of the non-contact type (e.g. a capacitive, inductive, infra-red, optical or R.F. link). The rotary coupling allows continuous rotation of the lower housing 12 relative to the upper housing 10.

Figure 2:
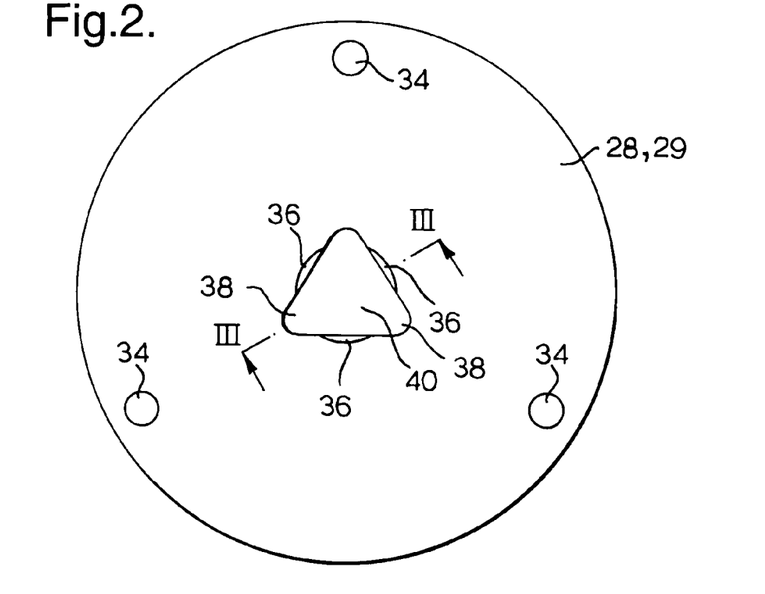
FIG. 2 shows a detail of a component shown in FIG. 1.

FIG. 2 shows the form of the supports 28 and 29. Holes 34 for mounting screws are shown, as is a central triangular aperture 40 for receiving a ball 20 or 22. In order that the support 28 be resiliently movable it is formed from sheet, for example steel material or other planar material with inherent resilient spring-like qualities. Support 28 is arranged to be deflectable under load, although, as described below, may be preloaded at assembly also.

For simplification of manufacture support 29 can be identical to support 28 but mounted rigidly (as illustrated) or a thicker material can be used. Alternatively support 29 might be integral with the lower housing 12.

In this design three ball contacting areas 36 are formed on the three sides of the aperture 40. These areas are formed with a curved surface having a radius larger than the radius of the ball 20 or 22. Areas 38 do not contact the ball. The contacting areas are formed by forcing a ball, of slightly larger diameter than the bearing ball 20, into the triangular recess.

The recesses may be coated with friction reducing material. The balls may be coated with friction reducing material also, but may lose some of their sphericity in the process, so this step is not favoured.

Figure 3:
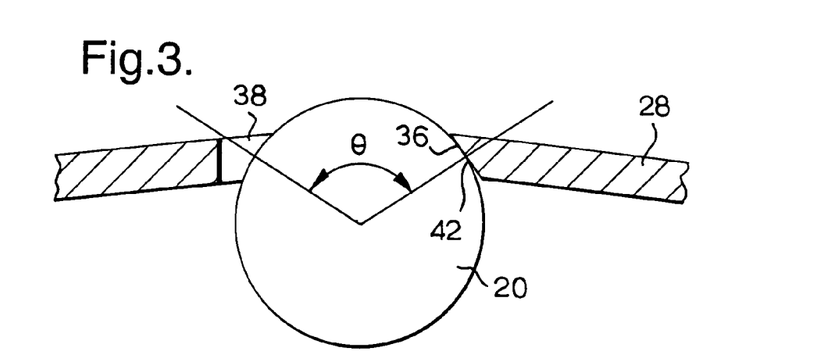
FIG. 3 shows a sectional view through line III—III in FIG. 2.

FIG. 3 is a section along line III—III in FIG. 2. In this drawing the support 28 is shown in a loaded condition. In this condition support 28 is deflected and each area 36 will have moved from an unloaded condition by the same amount relative to the axis of rotation. It will be noted that the curvature of the surface of each area 36 provides a contact point 42. In order to make this contact point lie in the middle of area 36, the surface is formed with its radius when the support 28 is loaded. A load may be applied to the support during assembly as a preload.

A cone generated by the revolution of a line between the centre of the ball 20 and its points of contact 42 with the support 28 will have a cone angle θ. This angle θ is chosen to minimise rotational friction, to maintain bearing radial stiffness and to inhibit dislodgement of the ball. Any angle between 20° and 175° can be used but an angle of about 80° has been found to be suitable.

The ball contacting areas 36 may be formed by forcing a cone into a support rather than a ball, to produce partially conical contact areas 36. In this instance, point contact will be achieved also.

Figure 4:
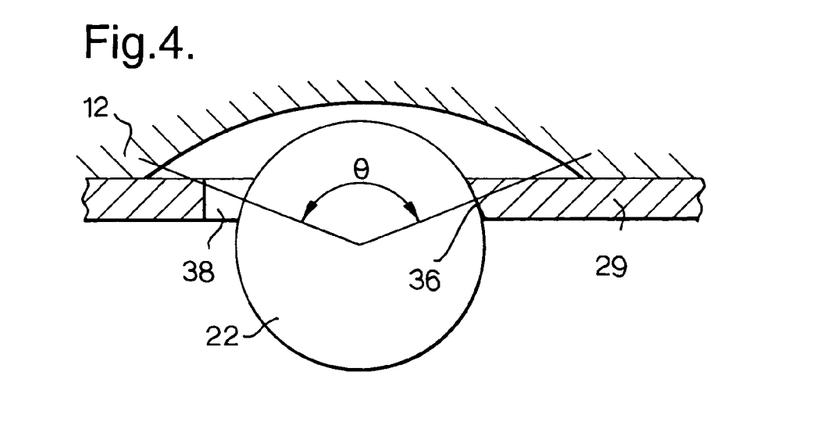
FIG. 4 shows a further detail of a part of a component shown in FIG. 1.

FIG. 4 shows a detail of a fixed support 29. This support may be manufactured in a slightly different manner to the support 28 shown in FIG. 3. Support 29 is not deflected in use but is held comparatively rigidly by lower housing 12. The contact surface 36 is again formed with a slightly larger radius than the radius of the ball but the support is not deflected whilst the radius is formed. The cone angle θ may be approximately the same as the angle θ formed at support 28.

Referring back to FIG. 1, spindle 18 is mounted between supports 30 and 32. An extension 19 of the spindle 18 carries the lower housing 12. The principles of construction of the balls 24,26 and their supports 30,32 are the same as those described above for the balls 20,22 and their supports 28,29. However, ball 24 is larger than the others because it carries the weight of the lower housing 12 and so requires greater stiffness, also it has to accommodate spindle extension 19. In this arrangement support 30 is fixed and support 32 is deflectable. Support 32 will be preloaded in the manner described above. The cone angles will be similar. Use of extension 19 through bearing 24/30 together with the rotary coupling 90 allows continuous rotations of lower housing 12 and its associated parts.

The configuration of spindle 18 and supports 30 and 32 provides tolerance to thermal effects because the lower end of the CMM quill 8 is close to the plane in which support 30 and ball 24 have contact. Thus thermal growth of housing 10 does not alter significantly the position of housing 12 because there is little material in the width between the base of the CMM quill and the said plane.

This means that any changes in dimension of upper housing 10 due to thermal effects will not alter substantially the position of the stylus 4.

An alternative bearing arrangement for upper housing 10 is shown in FIG. 5. This arrangement has a fixed support 30 at the top and the deflectable support 32 below.

FIGS. 6A–6F show examples of some permutations of ball and support configuration. For ease of identification the fixed supports have been referenced as 50, deflectable supports 55, and relatively rotatable parts 60 and 65. All these permutations fall within the ambit of the invention.

FIG. 7 shows another, alternative arrangement of bearing parts. In this arrangement balls 20 and 22 are each supported in ball race bearings 80. The races 80 are in turn held in supports 28' and 29'. As discussed above support 28' allows some axial movement, and support 29' is relatively rigid. A preload is applied to the supports and balls as discussed above. Use of ball races 80 reduces friction. The supports 28' and 29' need not have triangular holes, holding the ball races 80 in place.

The reference numerals used in FIG. 7 relate to the horizontal axis shown in FIG. 1, however, a similar "ball raced" construction may be employed also for the vertical axis bearings of the embodiment shown in FIG. 1.

An alternative construction of the ball and support contact area is shown in FIG. 8. In this embodiment support 28,29, 30,32 is flanged to accommodate ball 20,22,24,26. The ball rests on an annular low friction collar 82 which may be manufactured from P.T.F.E., a ceramic or a similar low friction material. The collar may be replaced with three pads of a similar material. In either case the collar or pads may be fixed with adhesive to the support.

Yet another alternative construction of the ball and support contact area is shown in FIG. 9. In this embodiment support 28, 29, 30, 32 has adhered thereon a block of elastically deformable material 84 e.g., P.T.F.E. or other low friction plastics material or an oil impregnated sintered product having a conical recess therein. The recess accommodates ball 20, 22, 24, 26. The elastic properties of the material of the block takes up slight deviations in the roundness of the ball so that the relative rotation of the block and ball has greater circular accuracy than the circular accuracy of the ball alone.

Figure 10:
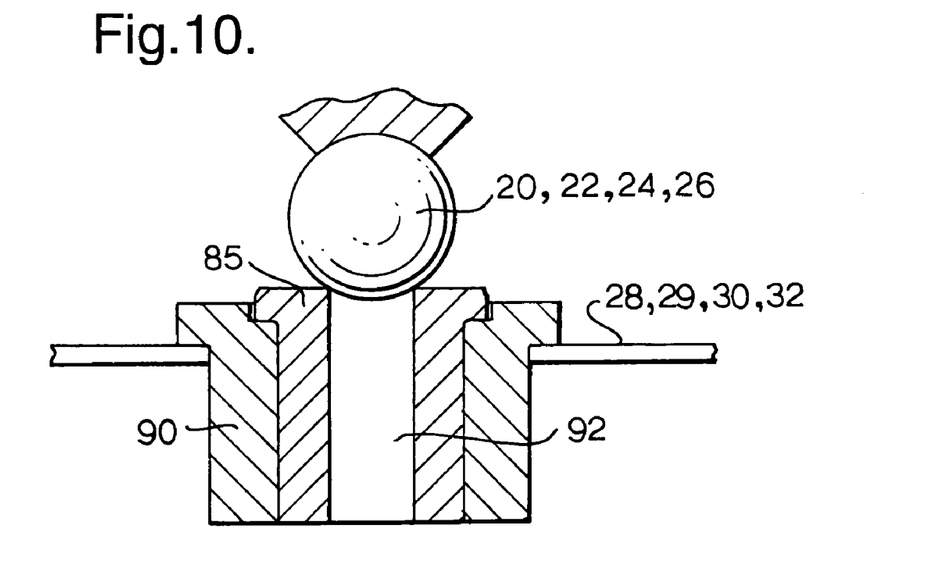
Figure 11:
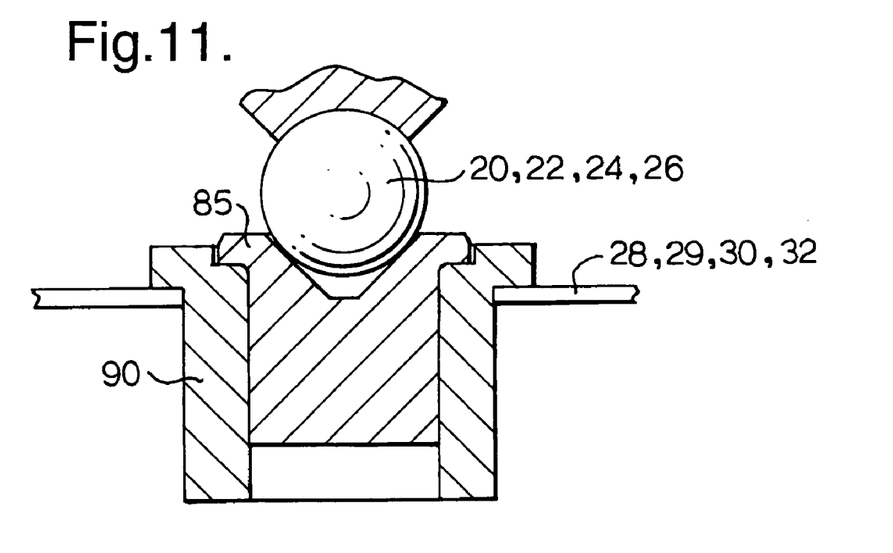

Further embodiments of the ball and support construction are shown in FIGS. 10 and 11. In each of the Figures ball 20,22,24,26 is supported in a plastics insert 85 of P.T.F.E. or the like supported within an outer collar 90. The ball of FIG. 10 is supported in a cylindrical recess 92 and the ball of FIG. 11 is supported in a conical recess 94. Again the plastics insert will, under load, deform elastically to the shape of the ball and during relative rotation take up any out-of-roundness of the ball to give accurate circular motion.

Various modifications and enhancements will be apparent to the skilled addressee. For example whilst spherical bearings and triangular apertures are illustrated, within the ambit of the invention, any configuration of sliding contact between male and female parts is possible providing contact is made in a plane. It is possible that this plane, whilst it will be perpendicular to the axis of rotation in the illustrated embodiments, may not be so e.g. if supports 28 and 29 say lie in planes offset to the perpendicular and balls 20 and 22 are used.

So the supports illustrated may, according to the invention, be simply a recess e.g. a circular hole, a conical recess, a trihedral recess, a multi-sided hole, or the like, perhaps formed directly into a housing 12 or 10, or in the form of an insert in a sprung plate. A support might be formed also in a spindle 16 or 18, in which case a male part would be connected to the housing 10 or 12.

The male part may be any shape e.g. spheroidal, elliptical, conical, trihedral, or polygonal. If the male part is non-circular then the support must be circular, and vice versa. Where the support or male part is non-circular then contact at discrete points between the two is made, these points will lie on a plane also.

The male/female parts of each bearing assembly may differ in construction.

Whilst the discrete locations at which the balls make sliding contact with the supports are illustrated as sides of an aperture, they may be the sides of a recess, e.g. a low friction insert having a faceted recess in a support. Contact might be provided at the edges of an aperture or recess.

Also the spindles 16 and 18 may be constrained against excessive movement away from their axes of rotation such that should the spindle be forced out of register with a support it would be pushed back into register by virtue of the resilient nature of one of the supports.

The embodiments described above have certain advantages over the prior art. In particular, the embodiments allow wear and/or changes in dimensions of the component parts mentioned to be accommodated without significant loss in accuracy or repeatability, i.e. change in position of the stylus.

For example a change in the dimension between balls 20 and 22 can be accommodated by resilient movement of support 28. This movement causes all points of contact between support 28 and ball 20 to move along the axis A by the same amount and therefore the position of the axis A does not change as a result of the resilient movement. Whilst the stylus may move slightly parallel to the axis A, its movement will be small in comparison to the change in dimension between the walls 20 and 22 (approximately half).

Positional stability of the stylus is achieved also by the provision of a fixed support 29. The fixed support provides positive positioning of the spindle 16 at one position on the axis A.

The same advantages are gained by the configuration of the bearings 30/24 and 32/26 in the upper housing 10. Likewise the permutations shown in FIGS. 6A–F have the advantages mentioned in the preceding paragraph.

What is claimed is:

1. A probe head for mounting on a machine, the probe head having an articulatable wrist for supporting a measurement probe about two axes of rotation, the wrist comprising:
   an upper housing for connection to the machine;
   a lower housing rotatably connected to the upper housing and being rotatable relative to the upper housing about a first axis in a continuous manner over more than one revolution;
   a measurement probe;
   a carriage rotatably connected to the lower housing for supporting the measurement probe and being rotatable relative to the lower housing about a second axis generally transverse to the first axis; and
   a rotary coupling between the upper and lower housings allowing the continuous rotation about the first axis providing a power path between the upper and lower housings.

2. The probe head as claimed in claim 1, wherein the rotary coupling further provides a signal path.

3. The probe head as claimed in claim 2, wherein the rotational position of the carriage relative to the lower housing is determined and a signal indicative of that position travels along the signal path provided by the rotary coupling.

4. The probe head as claimed in claim 2, wherein the signal path of the rotary coupling provides a path for a signal from the measurement probe supportable by the carnage.

5. The probe head as claimed in claim 1, wherein the rotary coupling employs slip rings.

6. The probe head as claimed in claim 1, wherein the rotary coupling has elements which do not contact, selected from one of a group consisting of capacitive, inductive, infra red, optical and R.F. type elements.

7. The probe head as claimed in claim 1, wherein the carriage is motorized for rotation about the second axis and the motor is supplied with power from the power path.

8. The probe head as claimed in claim 1, the wrist further comprising:
   a bearing arrangement for allowing the continuous rotation about the first axis, wherein the bearing arrangement includes a spindle between two bearing assemblies and an extension to the spindle extending beyond the two bearing assemblies in a direction of the first axis, connecting the upper housing and the lower housing.

9. The probe head as claimed in claim 8, wherein at least one of the two bearing assemblies includes a female part having a recess or aperture and a male part acceptable into the female part and wherein the male and female parts are in relative sliding contact.

10. The probe head as claimed in claim 9, wherein the male part includes a ball.

11. The probe head as claimed in claim 9, wherein the female part provides a plurality of discrete areas of contact for the ball.

12. The probe head as claimed in claim 8, wherein at least one of the two bearing assemblies is resiliently mounted for resilient movement in a direction substantially parallel to the first axis.

13. A probe head having an articulatable wrist supporting a measurement probe and allowing the probe to rotate about two axes of rotation, the wrist comprising:
   an upper housing for connection to a coordinate measurement machine;
   a lower housing rotatably connected to the upper housing and being rotatable relative to the upper housing about a first axis in a continuous manner by means of a first motor; and
   a carriage rotatably connected to the lower housing supporting the measurement probe and being rotatable relative to the lower housing about a second axis generally transverse to the first axis, by means of a second motor; and
   a rotary coupling allowing the continuous rotation about the first axis, providing a power path at least for the second motor.

14. The probe head as claimed in claim 13, wherein the rotary coupling further provides a signal path between the upper housing and the lower housing for carrying a signal indicative of the rotational position of the carriage relative to the lower housing.

15. The probe head as claimed in claim 13, wherein the rotary coupling employs slip rings.

16. The probe head as claimed in claim 13, wherein the rotary coupling has elements which do not contact, selected from one of a group consisting of capacitive, inductive, infra red, optical and R.F. type elements.

17. The probe head as claimed in claim 13, wherein the rotational position of the carriage relative to the lower housing is determined by means of a rotary encoder.

18. The probe head as claimed in claim 13, the wrist further comprising:
   a bearing arrangement for allowing the continuous rotation about the first axis, wherein the bearing arrangement includes a spindle between two bearing assemblies and an extension to the spindle extending beyond the bearing assemblies in a direction of the first axis, connecting the upper housing and the lower housing.

19. The probe head as claimed in claim 18, wherein at least one of the bearing assemblies includes a female part having a recess or aperture and a male part acceptable into the female part and wherein the male and female parts are in relative sliding contact about the first axis.

20. The probe head as claimed in claim 18, wherein at least one of the bearing assemblies is resiliently mounted for resilient movement in a direction substantially parallel to the first axis.

21. The probe head as claimed in claim 19, wherein the male part includes a ball and wherein the female part provides a plurality of discrete areas of contact for the ball.

* * * * *